United States Patent Office 2,714,020
Patented July 26, 1955

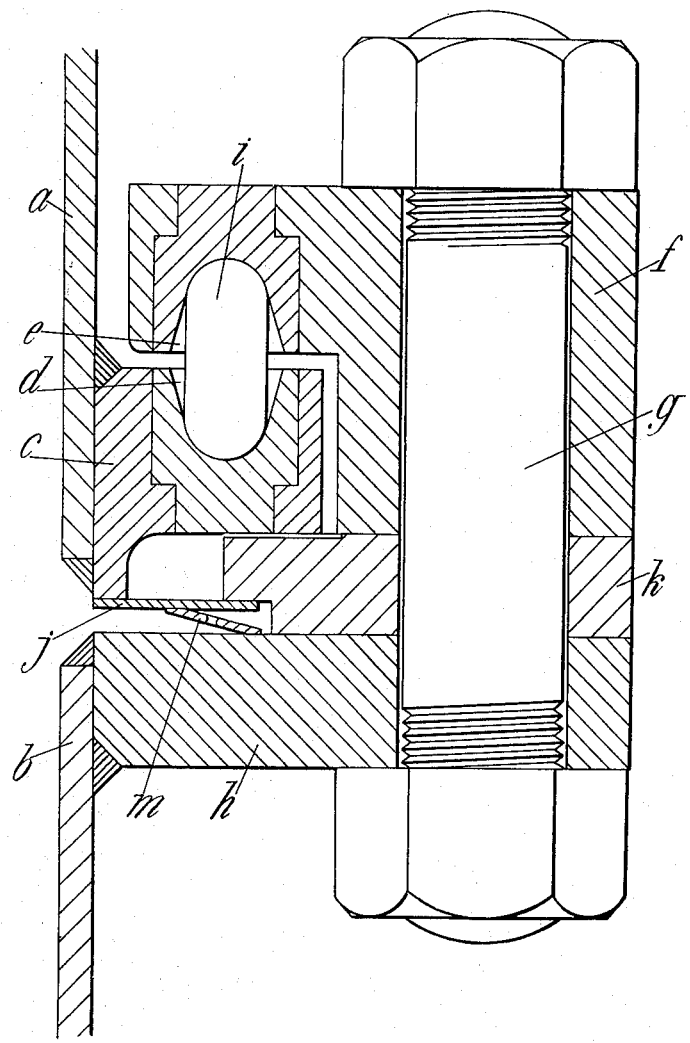

2,714,020

FLEXIBLE PIPE JOINTS

Henry George Yates, Riding Mill, England, assignor to The Parsons and Marine Engineering Turbine Research and Development Association, Wallsend, England Application October 19, 1951, Serial No. 252,038

Claims priority, application Great Britain August 2, 1951

3 Claims. (Cl. 285—90)

This invention relates to pipe joints of the kind in which axial thrusts imposed on the pipes, e. g. by fluid pressure does not affect relative axial movement but a certain amount of yielding between the connected pipe lengths is to be permitted, such yielding being of torsional nature or by way of relative tilting.

The object of the present invention is to provide improved or simplified forms of such joints wherein the frictional forces to be overcome in order to bring about the above permitted relative motion of two adjoining pipe lengths are comparatively small.

The invention consists in a pipe joint having features as set out in the claims appended hereto.

The accompanying diagrammatic drawing illustrates an axial sectional view of part of a flexible pipe joint embodying the present invention.

In carrying the invention into effect according to the convenient form illustrated by way of example in the accompanying drawing as applied to pipes conveying gas under pressure, one end of one of two pipe lengths $a$, $b$ is furnished with a rigid flange $c$ furnished on one face with a set of cup-shaped sockets $d$ in axial register with a further set of similar sockets $e$ in a preferably split clamping ring $f$. The clamping ring $f$, which embraces the first pipe length $a$, is secured by a set of axial bolts $g$ to a flange $h$ rigid on the adjacent end of the adjacent pipe length $b$.

Interposed between each pair of registering sockets $d$, $e$ is a pin $i$ having rounded ends, the pins being in compression under the action of hydraulic pressure in the pipe.

A sealing ring $j$ is fitted in a gap between the two adjacent ends of the pipes to prevent fluid leakage, this ring being annular in form and adapted to bear in the region of its inner periphery against a suitable surface at the end of the pipe $a$ and to bear in the region of its outer periphery against a suitable surface on a seat ring $k$ interposed between the clamping ring $f$ and the flange $h$. The fluid pressure in the pipes holds the sealing ring in close contact with these surfaces, thus preventing fluid leakage.

A spring member is also provided to keep the sealing ring in position in the absence of fluid pressure. This spring member conveniently comprises a conical ring $m$ of thin metal perforated at intervals and of axial length slightly greater than the axial space available for it so that it is slightly compressed when the pipe joint is assembled and the arrangement is such that the effectiveness of the seal increases in proportion to the pressure against which it is required to seal.

In an alternative arrangement, instead of employing compression members such as $i$ between the registering sockets, tension members and modified sockets are substituted.

The type of flexibility afforded by joints embodying the present invention allows relative movement of the two ends of adjacent pipe lengths in a direction normal to the pipe axis, and also allows slight tilting of one pipe relative to the other about an axis normal to the axis of the pipe. In particular, relative torsional movement of one pipe about the axis of the other is facilitated. By the use of two or more of these joints in a pipe run, differential expansion between the two ends of the complete pipe run may be readily compensated.

The frictional forces to be overcome in order to bring about relative permitted motion of two adjoining lengths are comparatively small. The hydraulic load on the sealing ring initiates friction proportional to its own magnitude only, and the much greater hydraulic load due to pressure acting over the cross sectional area of the pipe is attended with only slight friction because of the pivotal motion at the ends of the pins (or tie rods if used instead).

I claim:

1. A pipe joint comprising a flange on one end of each of two adjacent pipe lengths, a clamping ring, a seat ring, a plurality of bolts and nuts clamping said seat ring between said clamping ring and one of said flanges, said latter flange, said seat ring and said ring together loosely straddling the other of said flanges so as to provide axial clearance between said seat ring and said other flange, a plurality of sockets in said other flange individually in register with a plurality of sockets in said clamping ring, a compression pin interposed between each pair of opposing sockets and a flexible flat sealing ring engaging said seat ring and the end of one of said pipe lengths.

2. A pipe joint as claimed in claim 1 wherein said clamping ring is formed in at least two parts.

3. A pipe joint comprising a flange on one end of each of two adjacent pipe lengths, a clamping ring, a seat ring, a plurality of clamping bolts and nuts clamping said seat ring between said clamping ring and one of said flanges, said latter flange, said seat ring and said clamping ring loosely straddling the other of said flanges so as to provide axial clearance between said seat ring and said other flange, a plurality of sockets in said other flange individually in register with a plurality of sockets in said ring, a tension member interposed between each registering pair of sockets and a flexible flat sealing ring engaging said seat ring and the end of one of said pipe lengths.

References Cited in the file of this patent

UNITED STATES PATENTS

| 826,638 | Wilson | July 24, 1906 |
| 2,085,574 | Chandler | June 29, 1937 |
| 2,509,090 | Faccou | May 23, 1950 |